(12) United States Patent
Geue et al.

(10) Patent No.: US 10,288,055 B2
(45) Date of Patent: May 14, 2019

(54) ELECTRIC VACUUM PUMP, IN PARTICULAR FOR ARRANGING IN A VEHICLE

(71) Applicant: HELLA GmbH & Co. KGaA, Lippstadt (DE)

(72) Inventors: Ingo Geue, Bad Sassendorf (DE); Theodor Hueser, Geseke (DE); Christian Praest, Langenberg (DE); Raimund Wolke, Rietberg (DE)

(73) Assignee: Hella GmbH & Co. KGaA, Lippstadt (DE)

(*) Notice: Subject to any disclaimer, the term of this patent is extended or adjusted under 35 U.S.C. 154(b) by 0 days.

(21) Appl. No.: 15/959,643

(22) Filed: Apr. 23, 2018

(65) Prior Publication Data

US 2018/0238311 A1    Aug. 23, 2018

Related U.S. Application Data

(63) Continuation of application No. PCT/EP2016/074329, filed on Oct. 11, 2016.

(30) Foreign Application Priority Data

Oct. 23, 2015  (DE) .......................... 10 2015 118 111

(51) Int. Cl.
*F04B 39/12* (2006.01)
*F04B 39/14* (2006.01)
(Continued)

(52) U.S. Cl.
CPC ............ *F04B 39/123* (2013.01); *B60T 17/02* (2013.01); *F01C 21/10* (2013.01); *F04B 35/04* (2013.01);
(Continued)

(58) Field of Classification Search
CPC ...... F04B 39/12; F04B 39/121; F04B 39/123; F04B 39/127; F04B 39/14; F04B 53/22;
(Continued)

(56) References Cited

U.S. PATENT DOCUMENTS 4,842,492 A    6/1989  Gannaway
5,544,496 A *  8/1996  Stoll ....................... F01C 21/02
                                                          417/902

(Continued)

FOREIGN PATENT DOCUMENTS

DE          3872695 T2    12/1992
DE     102012112069 A1     6/2014
(Continued)

*Primary Examiner* — Bryan M Lettman
(74) *Attorney, Agent, or Firm* — Muncy, Geissler, Olds & Lowe, P.C.

(57) ABSTRACT

An electric vacuum pump, in particular for arrangement in a vehicle, having an electric motor and a pump part, which can be driven by the electric motor, so that air can be drawn into the pump part from a suction connection and wherein air can be taken out of the pump part out of an outlet connection. A motor flange is provided on which the pump part rests, and the outlet connection is disposed on the motor flange. A receiving space is formed in the motor flange into which space the outlet connection opens, and a rubber-elastic insert part, which has a hollow inner region which communicates with the outlet connection, is accommodated in the receiving space. The insert part has at least one air guide opening via which air can flow from the pump part into the inner region.

12 Claims, 3 Drawing Sheets

(51) Int. Cl.
  *F04B 53/22*   (2006.01)
  *F04C 29/12*   (2006.01)
  *F04B 35/04*   (2006.01)
  *B60T 17/02*   (2006.01)
  *F04B 37/14*   (2006.01)
  *F04B 39/00*   (2006.01)
  *F01C 21/10*   (2006.01)
  *F04C 25/02*   (2006.01)
  *F04C 18/344*  (2006.01)

(52) U.S. Cl.
  CPC .......... *F04B 37/14* (2013.01); *F04B 39/0044* (2013.01); *F04B 39/14* (2013.01); *F04B 53/22* (2013.01); *F04C 25/02* (2013.01); *F04C 29/12* (2013.01); *F04C 18/344* (2013.01); *F04C 2240/30* (2013.01); *F05C 2225/02* (2013.01)

(58) Field of Classification Search
  CPC .......... F04B 17/03; F04B 35/04; F04B 53/16; F04C 15/06; F04C 29/12; F04C 2240/30; F04C 2240/806
  See application file for complete search history.

(56) References Cited

U.S. PATENT DOCUMENTS

| | | | |
|---|---|---|---|
| 6,491,505 B1* | 12/2002 | Hueser | F04C 23/00 417/312 |
| 8,500,417 B2 | 8/2013 | Han et al. | |
| 9,429,159 B2 | 8/2016 | Geue et al. | |
| 2011/0171041 A1 | 7/2011 | Zhao et al. | |
| 2013/0075572 A1 | 3/2013 | Matsumoto et al. | |

FOREIGN PATENT DOCUMENTS

| | | |
|---|---|---|
| DE | 102013104375 A1 | 10/2014 |
| JP | 2012087700 A | 5/2012 |
| KR | 20110062078 A | 6/2011 |

* cited by examiner

ELECTRIC VACUUM PUMP, IN PARTICULAR FOR ARRANGING IN A VEHICLE

This nonprovisional application is a continuation of International Application No. PCT/EP2016/074329, which was filed on Oct. 11, 2016, and which claims priority to German Patent Application No. 10 2015 118 111.8, which was filed in Germany on Oct. 23, 2015, and which are both herein incorporated by reference.

BACKGROUND OF THE INVENTION

Field of the Invention

The present invention relates to an electric vacuum pump, in particular for arrangement in a vehicle, comprising an electric motor and comprising a pump part, which can be driven by the electric motor, so that air can be drawn into the pump part from a suction connection and wherein air can be taken out of the pump part out of an outlet connection, and wherein a motor flange is provided on which the pump part rests, and wherein the outlet connection is disposed on the motor flange.

Description of the Background Art

DE 10 2012 112 069 A1, which corresponds to U.S. Pat. No. 9,429,159, which is incorporated herein by reference, and which shows a generic electric vacuum pump for arrangement in a vehicle, and vacuum pumps of this kind are used to feed gases in motor vehicles, for example, for engine management and/or for boosting the braking force.

Conventional vacuum pumps are designed, for example, as vane cell pumps. Due to the arrangement of the vacuum pump in the engine compartment of the vehicle, it is exposed to dirt and splashing water, so that the entry of dirt and especially water into the outlet connection and through it into the pump part should be prevented, especially when the vacuum pump is switched off. In particular, when the outlet connection is located directly on the motor flange, there is the risk of water entering the pump part. This risk is particularly high when the outlet connection is located at the low point of the motor flange with respect to the vacuum pump installation position. If, for example, the vacuum pump is used in a horizontal position in that the motor axis extends substantially in a horizontal direction, then the outlet connection also runs in a horizontal extension axis, so that, for example, water can penetrate into the outlet connection. Because a connection channel attaches to the outlet connection on the inside of the motor flange, the water enters the pump part directly and can damage it.

In the case of vacuum pumps in which the outlet connection is provided directly on the motor flange, there is the additional problem of sound reduction, because noise arises particularly due to the design of the pump part as a vane cell pump; this noise should be minimized as much as possible during operation of the vacuum pump. Such noises reach the surrounding area in particular via the outlet connection, so that in addition soundproofing of the outlet connection is likewise desirable.

SUMMARY OF THE INVENTION

It is therefore an object of the present invention to provide an electric vacuum pump with an increased lifetime. In particular, it is the object to refine an electric vacuum pump in such a way that the penetration of water into the pump part is prevented. In addition, it is the object of the invention to minimize the emission of noise, in particular, via the vacuum pump outlet connection.

In an exemplary embodiment, the invention provides that a receiving space into which the outlet connection opens is formed in the motor flange, and wherein a rubber-elastic insert part, which has a hollow inner region which communicates with the outlet connection, is accommodated in the receiving space, and wherein the insert part has at least one air guide opening by means of which air can flow from the pump part into the inner region.

As such, a rubber-elastic insert part is arranged in the motor flange, so that a direct connection between the outlet connection and the pump part is prevented. As a result of the design of the insert part, the outlet connection first opens into the inner region in the insert part, and in an arrangement that is offset from the outlet connection, the at least one air guide opening is formed in the insert part, so that water entering through the outlet connection cannot enter the air guide opening directly. The receiving space, which is introduced in the manner of a cavity in the motor flange, is formed to accommodate the rubber-elastic insert part.

Advantageously, the receiving space is formed starting from an end face of the motor flange as a recess, wherein the pump part is mounted on the end face of the motor flange. After the pump part is mounted, the rubber-elastic insert part is therefore completely enclosed in or between the motor flange and the pump part. For example, the insert part can be pressed into the recess in the motor flange, so that the insert part is held securely in the receiving space by means of a subsequent arrangement of the pump part on the end face.

The insert part is adapted with further advantage to the contour of the receiving space at least with a lateral surface, such that the insert part after being pressed into the receiving space sits in a self-retaining and sealing manner in the receiving space by means of an elastic deformation of the insert part. For example, the insert part has a minimal excess, and when the insert part is pressed into the recess, there is a slight elastic deformation of the insert part, so that the self-retaining arrangement of the insert part in the receiving space is already created thereby. If the insert part is seated under slight tension in the receiving space, the lateral surface also seals against the wall of the receiving space, so that no dirt and in particular water can reach the pump space between the insert part and the receiving space. On the upper side, the insert part terminates with a top surface that can protrude slightly beyond the end face of the motor flange, and after the pump part is mounted, the insert part is also slightly compressed in the motor axis direction, as a result of which a further seal is achieved between the insert part and the pump part.

The at least one air guide opening is introduced in a position in the insert part in which there is an offset of the air guide opening to an extension axis of the outlet connection, when the insert part is taken up in the receiving space. Consequently, the offset occurs between the air guide opening and the opening of the outlet connection in the inner region of the insert part, and depending on the installation position of the vacuum pump, the offset forms a height offset, so that penetration of water into the pump part is particularly effectively prevented by the geodetic height difference.

The at least one air guide opening, with further advantage, may have a shorter distance from the motor axis than the extension axis of the outlet connection. When the vacuum pump is designed for arrangement in an installation position in which the outlet connection faces downward with respect to the motor axis and with respect to a direction of gravity, the penetration of water is particularly effectively prevented. If water penetrates into the outlet connection, it accumulates maximally in the inner region of the rubber-elastic insert part, and when the vacuum pump is put back into operation, the operation of the vacuum pump again expels the water that has penetrated from the inner region of the insert part out of the vacuum pump via the outlet connection.

According to an embodiment of the electric vacuum pump of the invention, the insert part comprises a silicone rubber and/or a vinyl-methyl-polysiloxane (VMQ).

A further advantage in particular for preventing the penetration of water into the pump part is achieved when the air guide openings, starting from the inner region outwards to a top surface of the insert part, are made tapered in cross section. Due to this funnel shape, which opens into the inner region of the insert part, there is in addition the advantage of sound reduction, because air entering the air guide opening from the pump part expands in a pulsed fashion and noise arising as a result is minimized. In particular, the rubber-elastic properties of the insert part dampen the sound from the pump part, because the insert part is caused to vibrate slightly, as a result of which the vibrations are absorbed.

The invention is further directed to an insert part for an electric vacuum pump as described above. The further features and associated advantages of the insert part are also taken into account for the claimed insert part. In particular, the insert part is made of silicone rubber and/or of a vinyl-methyl-polysiloxane (VMQ) and has an inner region, and the insert part comprises at least one air guide opening which is arranged with an offset for connecting the inner region to the outlet connection.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
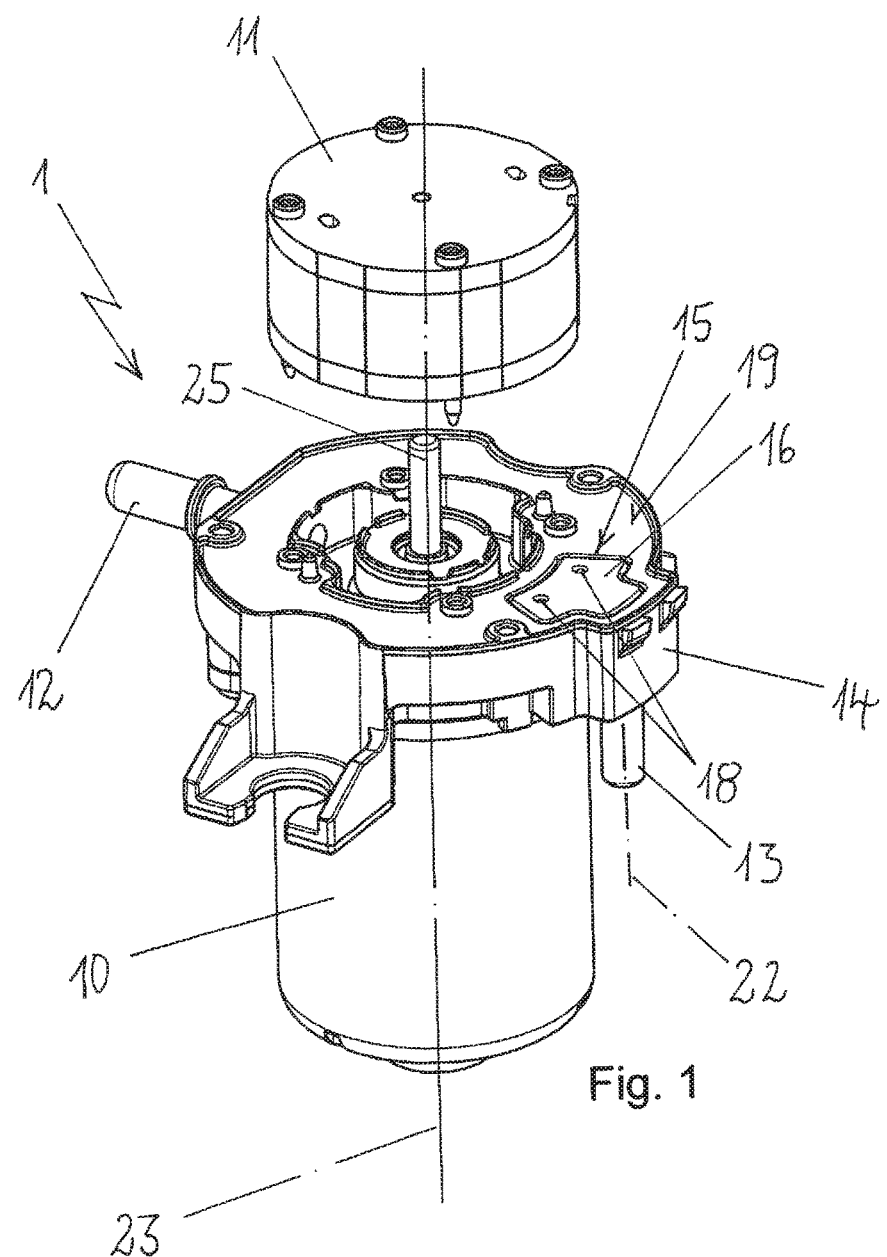
FIG. 1 is a perspective view of an electric vacuum pump with a disassembled pump part, so that the rubber-elastic insert part of the invention in the motor flange is shown.

FIG. 1 shows in a perspective view an electric vacuum pump 1 comprising an electric motor 10 and comprising a pump part 11, and the electric motor 10 has a motor shaft 25 which runs along a motor axis 23. Electric motor 10 has a substantially cylindrical shape and has on the upper side a motor flange 14 from which motor shaft 25 protrudes, and when pump part 11 is mounted on end face 19 of motor flange 14, motor shaft 25 projects into pump part 11 and drives it during operation of vacuum pump 1. The pump part 11 can be designed, for example, as a vane cell pump. During operation of electric vacuum pump 1, it draws in air via suction connection 12, and the drawn-in air is provided compressed via outlet connection 13. The illustrated design of electric vacuum pump 1 has an outlet connection 13 which extends with its extension axis 22 on the outside to motor 10 approximately parallel to motor axis 23. In contrast, suction connection 12 protrudes from motor flange 14 approximately perpendicularly to motor axis 23.

Starting from end face 19, a receiving space 15 is formed in motor flange 14, in which space a rubber-elastic insert part 16 is inserted. Insert part 16 has a shape which substantially completely fills the contour of receiving space 15. On the upper side, insert part 16 has air guide openings 18 by which an air connection of insert part 16 to pump part 11 is created. The inner region of insert part 16 in this case communicates with outlet connection 13, wherein air guide openings 18 are closer to motor axis 23 than outlet connection 13 with its extension axis 22.

Figure 2:
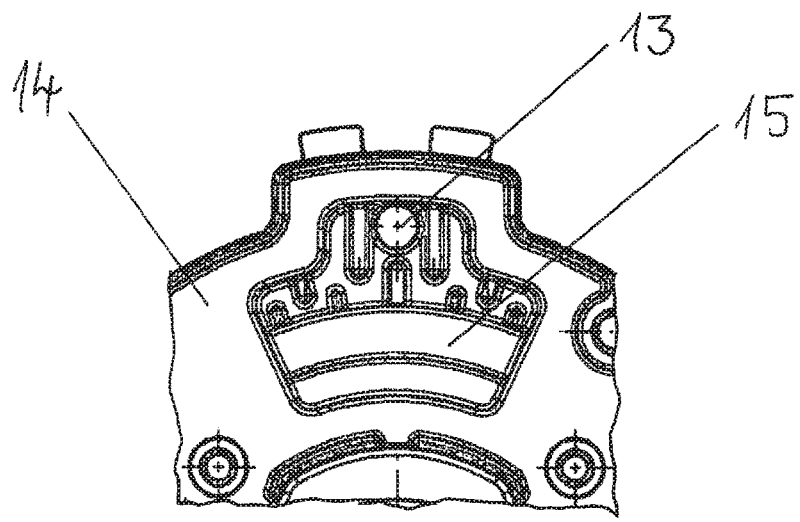
FIG. 2 is a detail view of a receiving space in the motor flange for accommodating a rubber-elastic insert part of the invention.

FIG. 2 shows a top plan view of motor flange 14 in the region of receiving space 15 which is introduced into motor flange 14 and in which rubber-elastic insert part 16 can be inserted. The top plan view shows outlet connection 13, which opens into receiving space 15.

Figure 3:
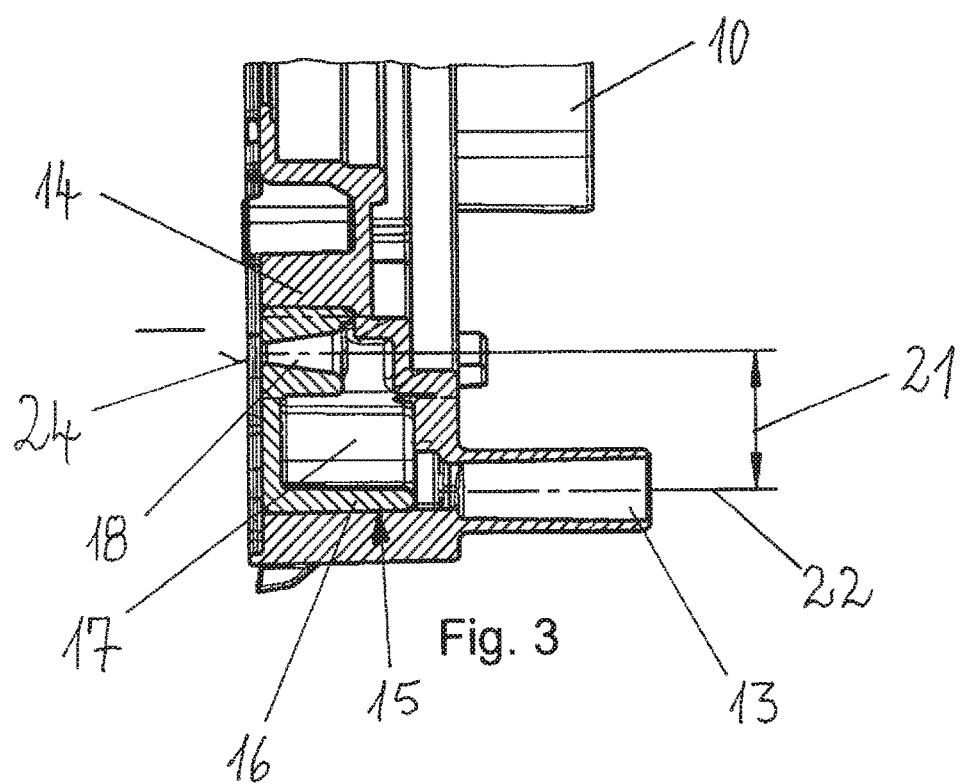
FIG. 3 is a side view of the arrangement of the rubber-elastic insert part in the receiving space in a cross-sectional view.

FIG. 3 shows a cross-sectional view of motor flange 14 in the region of receiving space 15 in which rubber-elastic insert part 16 is inserted. The cross-sectional view shows a fluidic connection of outlet connection 13 to inner region 17 of insert part 16. Air duct opening 18 introduced into insert part 16 has the offset 21 to extension axis 22 of outlet connection 13, and if outlet connection 13 is located on a bottom side due to the mounting position of vacuum pump 1, offset 21 thus forms a height offset. If water penetrates into outlet connection 13, then it essentially only reaches inner region 17, but the water does not enter air guide opening 18.

Insert part 16 on the side opposite to the arrangement of electric motor 10 on motor flange 14 has a top surface 24, and if the pump part is mounted on motor flange 14, top surface 24 terminates with the pump part and seals against it. In the same way, insert part 16 seals against the edge of receiving space 15, in particular when insert part 16 is slightly oversized with respect to the dimensions of receiving space 15.

Figure 4:
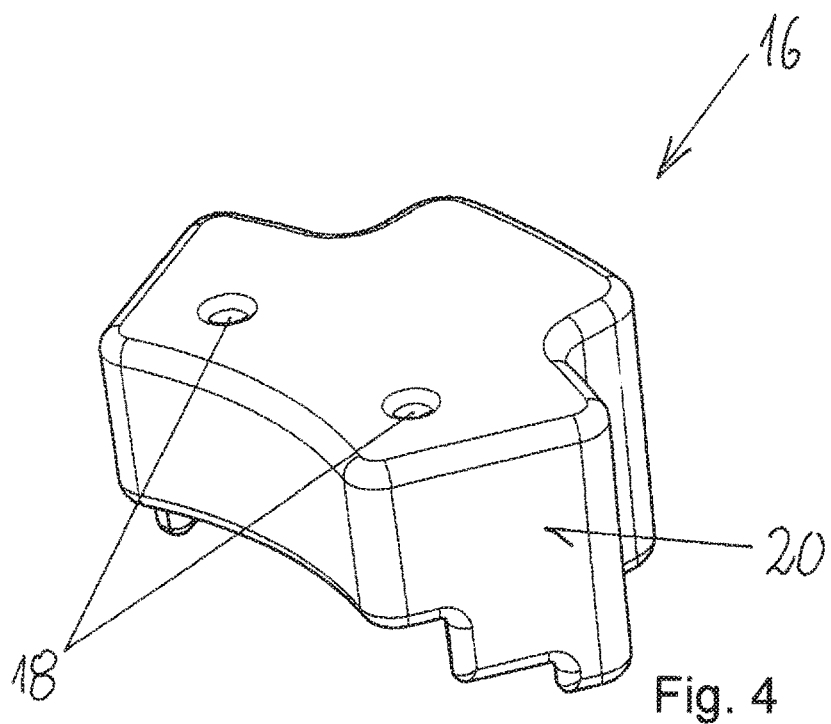
FIG. 4 is a first perspective view of a rubber-elastic insert part.
Figure 5:
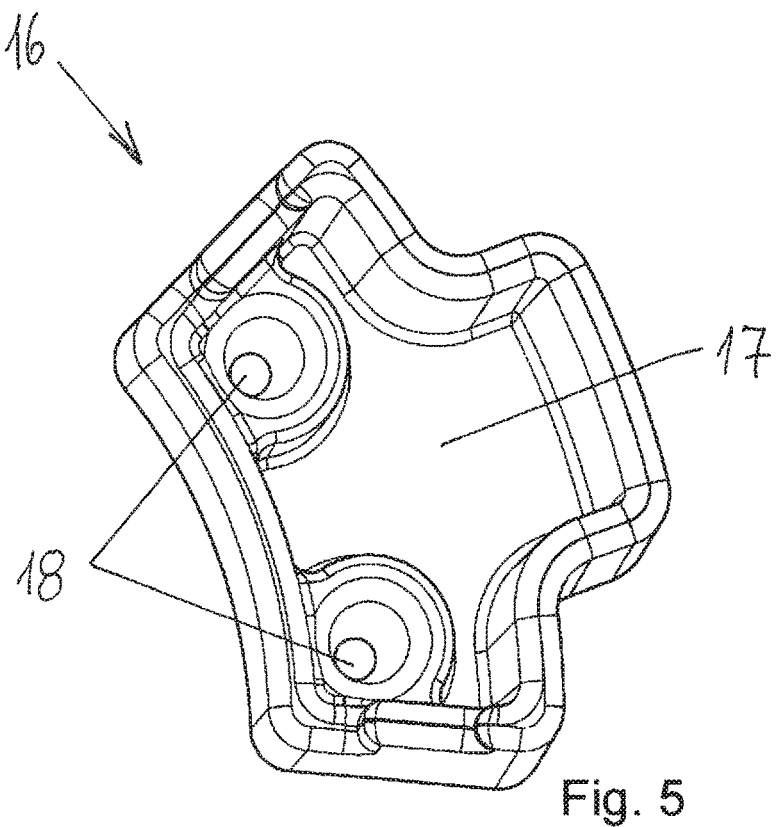
FIG. 5 is a further perspective view of the rubber-elastic insert part.

FIG. 4 shows a first perspective view of rubber-elastic insert part 16, and FIG. 5 shows a further perspective view of insert part 16 from a bottom side, so that inner region 17 is shown. The outer region of insert part 16 terminates with a circumferential lateral surface 20, which can seal against the wall of receiving space 15. On the upper side, air guide openings 18 open into the area to which pump part 11 connects when insert part 16 is arranged in receiving space 15 and when pump part 11 is seated on motor flange 14.

The bottom view of insert part 16 shows air guide openings 18 with a contour that opens conically toward inner region 17, as a result of which arising noise during operation of the vacuum pump is minimized.

The invention is not limited in its execution to the preferred exemplary embodiment described above. Rather, a number of variants are conceivable which make use of the illustrated solution in fundamentally different embodiments as well. All features and/or advantages emerging from the claims, description, or drawings, including structural details and spatial arrangements, can be essential to the invention both alone and in the most diverse combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electric vacuum pump for a vehicle, the pump comprising:
   an electric motor;
   a pump part adapted to be driven by the electric motor such that air is adapted to be drawn into the pump part from a suction connection and air is adapted to be taken out of the pump part via an outlet connection;
   a motor flange on which the pump part rests, the outlet connection being arranged on the motor flange;
   a receiving space formed in the motor flange into which space the outlet connection opens; and
   a rubber-elastic insert part, which has a hollow inner region that communicates with the outlet connection, is arranged in the receiving space, and the insert part having at least one air guide opening via which air is adapted to flow from the pump part into the inner region,
   wherein the receiving space is a recess in an end face of the motor flange, the insert part being pressed in the recess, and the insert part being held securely in the receiving space via a subsequent arrangement of the pump part on the end face,
   wherein the end face of the motor flange has an opening in a central region thereof through which the drive shaft of the electric motor extends, and
   wherein an entirety of the receiving space is recessed from a portion of the end face of the motor flange that is offset from the central region of the end face of the motor flanqe, such that an entirety of the insert part being held in the receiving space is offset from the central region of the end face of the motor flange.

2. The electric vacuum pump according to claim 1, wherein the insert part is adapted to a contour of the receiving space at least with a lateral surface such that the insert part, after being pressed into the receiving space, sits in a self-retaining and sealing manner in the receiving space via an elastic deformation of the insert part.

3. The electric vacuum pump according to claim 1, wherein the at least one air guide opening is introduced in a position in the insert part in which there is an offset of the at least one air guide opening to an extension axis of the outlet connection when the insert part is taken up in the receiving space.

4. The electric vacuum pump according to claim 1, wherein the electric motor has a motor axis extending through a drive shaft, and wherein the at least one air guide opening has a shorter distance from the motor axis than the extension axis of the outlet connection.

5. The electric vacuum pump according to claim 1, wherein the insert part comprises a silicone rubber and/or a vinyl-methyl-polysiloxane.

6. The electric vacuum pump according to claim 1, wherein the vacuum pump is designed for arrangement in an installed position in which the outlet connection faces downward with respect to the motor axis and with respect to a direction of gravity.

7. The electric vacuum pump according to claim 1, wherein the at least one air guide opening, starting from the inner region outwards to a top surface of the insert part, is or are formed tapered in cross section.

8. An insert part for an electric vacuum pump according to claim 1.

9. The electric vacuum pump according to claim 1, wherein the electric motor has a motor axis extending through a drive shaft, and in an axial direction of the motor axis, the electric motor has a first end and a second end, wherein the pump part, the motor flange and the outlet connection are provided at the first end of the electric motor.

10. The electric vacuum pump according to claim 1, wherein the outlet connection is monolithic with the motor flange.

11. The electric vacuum pump according to claim 1, wherein the receiving space and the insert part being held in the receiving space are offset to one side of the central region of the end face of the motor flange.

12. The electric vacuum pump according to claim 1, wherein the electric motor has a motor axis extending through a drive shaft, and wherein the end face of the motor flange is oriented perpendicular to the motor axis.

* * * * *